US005601906A

United States Patent [19]
Henry

[11] Patent Number: 5,601,906
[45] Date of Patent: Feb. 11, 1997

[54] GEOSYNTHETIC BARRIER TO PREVENT WILDLIFE ACCESS TO CONTAMINATED SEDIMENTS

[75] Inventor: Karen S. Henry, Lyme, N.H.

[73] Assignee: The United States of America as represented by the Secretary of the Army, Washington, D.C.

[21] Appl. No.: 245,120

[22] Filed: May 17, 1994

[51] Int. Cl.$^6$ ........................................................ B32B 9/00
[52] U.S. Cl. ................................. 442/1; 428/85; 428/87; 428/131; 428/137; 405/258; 405/128; 405/107; 442/2; 442/35; 442/50; 442/57
[58] Field of Search ............................ 428/87, 85, 234, 428/246, 296, 300, 247, 224, 137, 131; 405/258, 128, 107, 109, 116, 50, 19, 15

[56] References Cited

U.S. PATENT DOCUMENTS

| 4,842,448 | 6/1989 | Koerner et al. | 405/258 |
| 5,102,260 | 4/1992 | Horvath et al. | 405/50 |
| 5,143,480 | 9/1992 | Scuero | 405/107 |
| 5,277,520 | 1/1994 | Travis | 405/128 |
| 5,401,552 | 3/1995 | Bohrer et al. | 428/87 |

*Primary Examiner*—N. Edwards
*Assistant Examiner*—Abraham Bahta
*Attorney, Agent, or Firm*—Luther A. Marsh

[57] ABSTRACT

A geosynthetic barrier adapted to deny wildlife access to contaminated sediments (CS), includes a geocomposite (10) formed of a top layer (14) juxtaposed on a bottom layer (12) which is adapted to be placed on the sediments. The top layer includes a geosynthetic drainage matrix having a plurality of openings, and the bottom layer includes a geotextile having a plurality of openings (12H) formed so as to allow gases to escape from the contaminated sediments on which said geocomposite is placed. The openings in the bottom layer of the geosynthetic barrier have a size in the range up to 200 cm and are spaced apart on centers having a range of between 6 cm to 600 cm, for example. The geosynthetic drainage matrix may be a geonet, a geogrid or a geomesh, fabricated from polyethylene, polypropylene, high density polyethylene, low density polyethylene, polystyrene, or high impact polystyrene. The top and bottom layers may be either separate layers, or may be joined together to produce a unified geocomposite web; may be held in place by a gravel layer (G) or other means; may be used in a subaqueous (W) or a non-subaqueous environment; and may provide a suitable environment through which vegetation (V) can be rooted.

12 Claims, 2 Drawing Sheets

GEOSYNTHETIC BARRIER TO PREVENT WILDLIFE ACCESS TO CONTAMINATED SEDIMENTS

The present invention pertains to a method and apparatus for protecting wildlife, and more particularly to the use of a geocomposite to deny wildlife access to contaminated sediments.

BACKGROUND OF THE INVENTION

A problem which exists in contaminated areas is the poisoning of wildlife due to ingestion of contaminants contained in sediments. This invention proposes to prevent access to wildlife to contaminated sediments in wetlands and other areas when the sediment forms a part of the natural setting for the wildlife, e.g. feeding and/or resting area such as ponds. Usually this problem is dealt with by removing and treating the contaminated sediment, which destroys or severely alters the natural habitat.

Previous methods of keeping wildlife and contamination separated include the construction of landfill liners and caps; but this applies to locales where the contamination is confined to a few relatively limited, well defined areas (since it was transported to and concentrates at the site): in addition, the contaminated material and capping is at least partially above the water table. The above two methods of reducing wildlife exposure to contamination, namely—1) removal and treatment of the material and 2) the construction of landfill liners and caps, are quite expensive, more complicated than the proposed barrier of the present invention, and don't pertain in situations where the contaminated sediment may lie on the bottom of ponds or other feeding areas for wildlife.

A third possible method of keeping wildlife from exposure to contaminants is the placement of a thick fill or soil layer over the contaminated area. However, this method would be susceptible to erosion caused by water movements, and if it is not thick enough, would be damaged by movement of large animals (e.g. moose), which punch through the soil layer.

Geosynthetic materials, including geotextiles, (see ASTM D4439-91a) are commonly used to separate dissimilar soils; but, on information and belief, have not been used to separate soil and wildlife, when the soil is submerged at least part of the time.

SUMMARY OF THE INVENTION

It is a primary object of the present invention to deny access to wildlife to contaminated sediments, while permitting gas formed in the sediment layer to escape.

It is also an object of the present invention to prevent access to wildlife to contaminated sediments in wetlands and other areas when the sediment forms a part of the natural setting for the wildlife, i.e. feeding and/or resting areas such as ponds.

It is an additional object of the invention to provide a means of preventing poisoning of wildlife due to ingestion of contaminants contained in sediments.

It is an additional object of the present invention to provide such a method and apparatus without removing and treating the contaminated sediment, thus avoiding the destruction or severe alteration of the natural habitat.

A further object of the invention is the provision of such an apparatus and method which does not require the construction of landfill liners and caps.

For a more complete understanding of the invention and the objects and advantages thereof, reference should be had to the accompanying drawings and the following detailed description wherein preferred embodiments of the invention are illustrated and described.

DETAILED DESCRIPTION OF THE PREFERRED EMBODIMENTS

Figure 1:
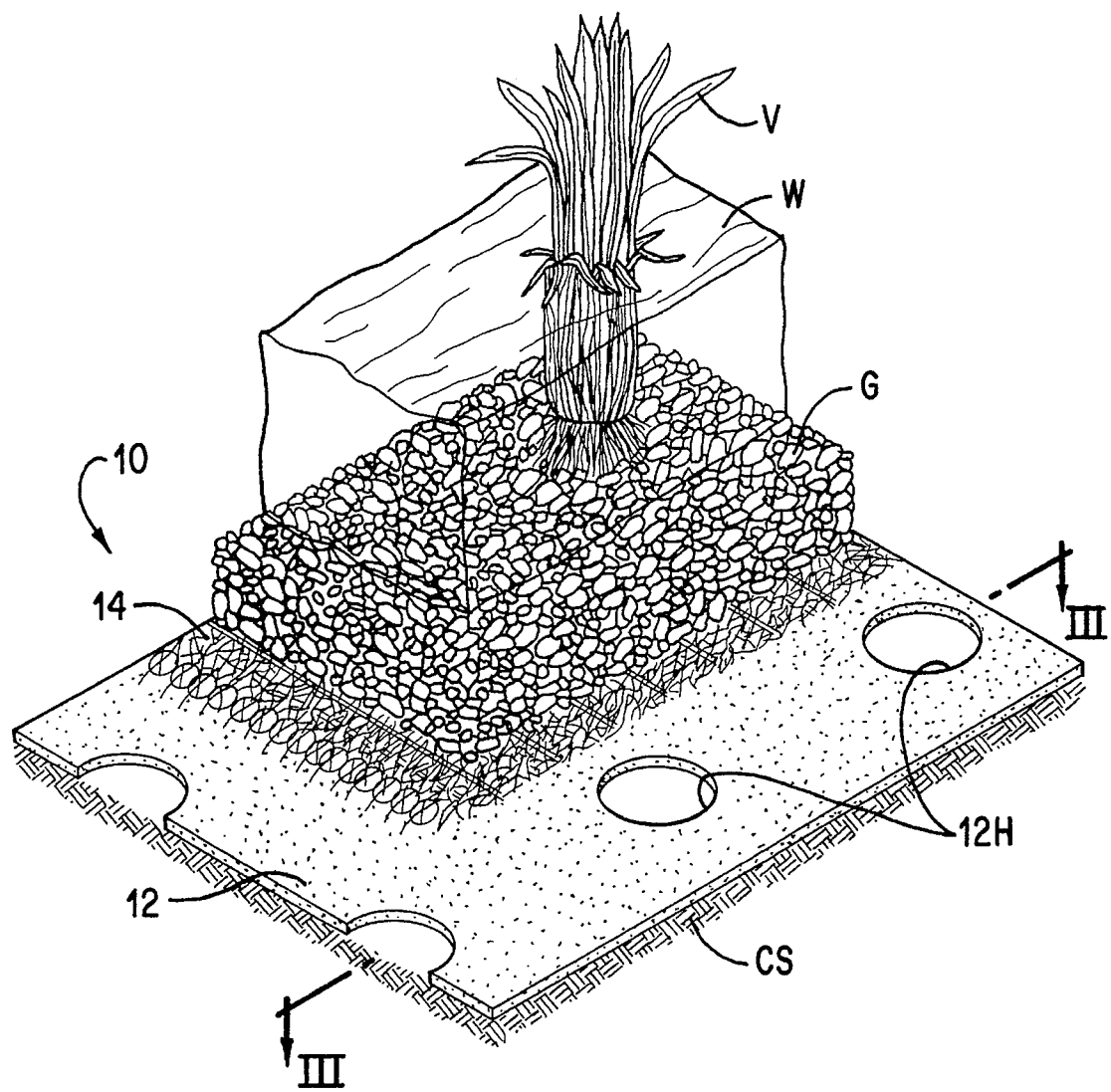
FIG. 1 is a perspective view illustrating the preferred embodiments of the geocomposite of the present invention, showing the geocomposite in situ in a wetlands area, superimposed on contaminated sediments, with a gravel covering, and illustrating the fashion in which vegetation may root through the geocomposite.
Figure 2:
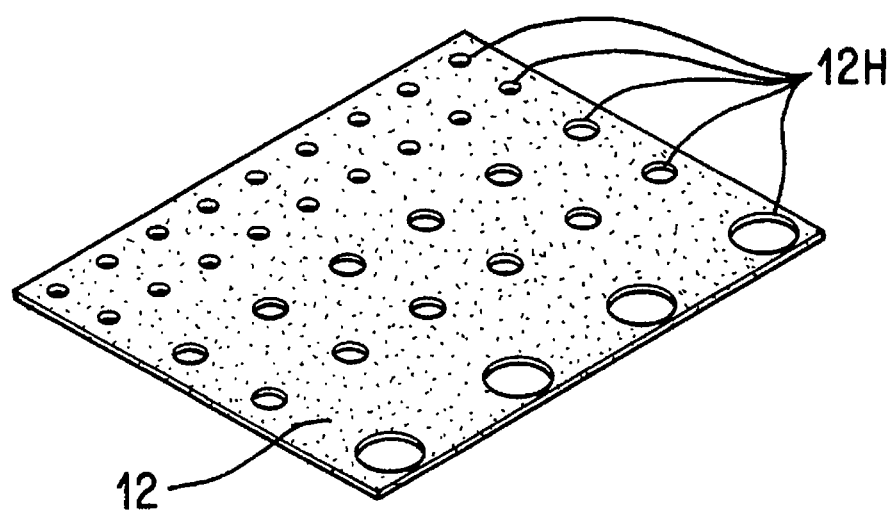
FIG. 2 is perspective view of the bottom layer of the geocomposite of the invention, illustrating the variety of holes which may be formed in the top layer thereof.
Figure 3:
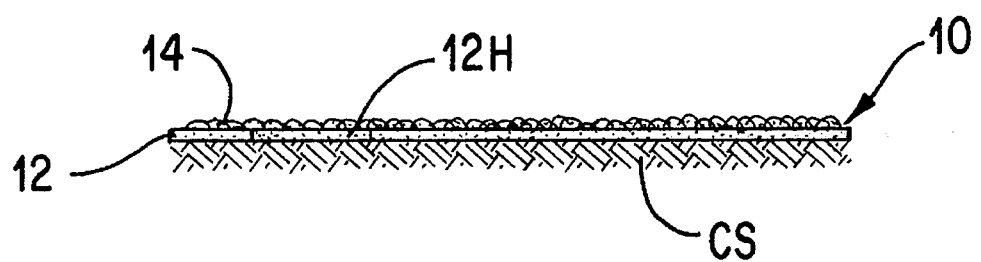
FIG. 3 is a cross section taken along line III—III of FIG. 1, illustrating the geocomposite of the invention in greater detail.

With reference to FIGS. 1, 2, and 3, a geocomposite made in accordance with the invention, designated generally by the reference numeral 10, includes a means to deny access of wildlife to contaminated sediments, while permitting gas formed in the sediment layer to escape. As explained hereinbefore, the problem to be solved is the poisoning of wildlife due to ingestion of contaminants contained in sediments. This invention provides means to prevent access to wildlife to contaminated sediments in wetlands and other areas when the sediment forms a part of the natural setting for the wildlife, i.e. feeding and/or resting area such as ponds. The geosynthetic barrier is a geocomposite 10 comprising a geotextile bottom layer 14 juxtaposed beneath a top layer 12 which might be a geonet, geogrid, entangled mesh or drainage matrix portion of a geosynthetic drain. The geotextile bottom layer 14 may have large holes 12H cut in it (up to 200 cm in diameter, spaced regularly approximately between 6 and 600 cm on center, respectively) to allow for gas formed in the sediments to escape before it pushes the geocomposite to the surface. Many possible variations of hole patterns are possible, as illustrated very schematically in FIG. 2. Suitable materials are those found in Geotechnical Fabrics Report (ISSN 0882-4983), such as that manufactured by Akzo Industrial Systems Co., of Asheville, N.C.

The essential features of the bottom layer 12 of the geocomposite 10 are 1) its large diameter holes compared to the geotextile bottom layer material per se to permit gas to escape, 2) the holes are small enough to provide a barrier across the large holes 12H in the geotextile to the wildlife being protected and/or to serve as a substrate to hold a fill material and 3) has the necessary tensile strength and other mechanical properties to survive construction and environmental stresses once it is placed.

The geotextile 14 may be fabricated of polypropylene, polyester or other polymer fibers woven, knitted, needle-punched or otherwise matted together to form a textile. Its function is to keep the top layer 12 of the geocomposite (geonet, entangled mesh or other drainage matrix portion of the geosynthetic drain) from becoming incorporated into the sediment. As such, it functions as a separator, and it should be designed based on the grain size distribution of the sediment on which it is placed.

The top layer 12 of the geocomposite is a hollow column drainage matrix portion of a geosynthetic drain, geonet, geogrid, or entangled mesh made of polyethylene, polypropylene, high density polyethylene, low density polyethylene, polystyrene, high impact polystyrene or other polymeric material. Its function is to serve as a barrier to the wildlife trying to gain access to the sediment which is contaminated (e.g. dabbling ducks) or to serve as a layer on which to place fill, which can also act as a barrier. In the latter case, this top geocomposite layer will have to be designed for the grain size distribution of the fill. In either case, it needs to cover any large holes in the geotextile holes cut to permit the gastoescope.

The bottom layer 14 and top layer 14 may either be separate material webs laid one on top of the other, and fixed in place as described below, or may be a unitary web of material, with the top and bottom layers fixed together in an appropriate fashion to form the geocomposite 10.

The geocomposite may be anchored and held in place by some combination of fill material placed on the top of it, vertical or diagonal pins, or long weighted tubes (e.g. pipes filled with granular material) fastened to it that lie on the ground surface or slightly below it.

Other advantages and features of the geocomposite of the invention are: 1) It can be laid over the contaminated sediment, eliminating the need to remove and/or treat the sediment, while denying access to the wildlife to the poisonous substance. This maintains the natural setting to a large extant.

2) It is lightweight and relatively easy to place compared to typical landfill caps or relatively thick layers of soil fill.

3) It allows for the escape of gas that may be formed in sediments below this layer. This avoids the problem of the barrier layer "bubbling up" over the pond bottom.

4) It is durable and may be designed to withstand relatively high construction and environmental stresses after it is put into place.

5) It is not as susceptible to erosion as layers of fill.

Furthermore, it is noted that the geocomposite on the invention may also used in non-sub-aqueous environments, in addition to the sub-aqueous environment described hereinabove.

The units shown in FIGS. 1 2, and 3 are only a few of many possible configurations and designs for the top and bottom layers, materials, and placement and arrangement of the holes 12H, consistent with the design parameters as set forth hereinabove.

Thus, while preferred embodiments of the invention have been illustrated and described in detail herein, it will be apparent that changes and additions may be had therein and thereto without departing from the spirit of the invention. Reference should, accordingly, be had to the appended claims in determining the true scope of the invention.

What is claimed is:

1. A geosynthetic barrier adapted to deny wildlife access to contaminated sediments, comprising;
    a geocomposite comprising a geosynthetic drainage matrix and formed of a top layer juxtaposed on a bottom layer which is adapted to be placed on said sediments;
    said top layer comprising a geosynthetic drainage matrix having a plurality of openings formed therein; and
    said bottom layer comprising a geotextile having a plurality of openings formed therein so as to allow gases to escape from said contaminated sediments on which said geocomposite is placed.

2. The geosynthetic barrier of claim 1 wherein the openings in said bottom layer have a size in the range from 2 cm up to 200 cm and are spaced apart from one another in such fashion as to be on 6 cm to 600 cm centers.

3. The geosynthetic barrier of claim 1 wherein said geosynthetic drainage matrix is a geonet.

4. The geosynthetic barrier of claim 1 wherein said geosynthetic drainage matrix is a geogrid.

5. The geosynthetic barrier of claim 1 wherein said geosynthetic drainage matrix is a geomesh.

6. The geosynthetic barrier of claim 1 wherein said geotextile is fabricated from a polymeric fiber.

7. The geosynthetic barrier of claim 6 wherein said geotextile is fabricated from a material selected from the group consisting of polypropylene and polyester fibers.

8. The geosynthetic barrier of claim 6 wherein said geotextile is fabricated by at least one of knitting, needle-punching, and matting together of said polymeric fiber.

9. The geosynthetic barrier of claim 1 wherein said top layer of said geocomposite is fabricated from a polymeric material.

10. The geosynthetic barrier of claim 1 wherein said top layer of said geocomposite is fabricated from a material selected from the group consisting of polyethylene, polypropylene, high density polyethylene, low density polyethylene, polystyrene, and high impact polystyrene.

11. The geocomposite of claim 1 in which the top layer of the geocomposite is fixed to the bottom layer of the geocomposite.

12. The geocomposite of claim 1 in which the top layer of the geocomposite is not fixed to the bottom layer of the geocomposite.

* * * * *